US007510242B2

(12) United States Patent
Yumoto et al.

(10) Patent No.: US 7,510,242 B2
(45) Date of Patent: Mar. 31, 2009

(54) CHILD SEAT, VENTILATION PORTION STRUCTURE OF ARTICLE AND COVER OF ARTICLE COMPRISING THE VENTILATION PORTION STRUCTURE, AND ARTICLE FOR CHILD

(75) Inventors: Ryoichi Yumoto, Saitama (JP); Yusuki Arii, Saitama (JP)

(73) Assignee: Combi Corporation, Tokyo (JP)

( * ) Notice: Subject to any disclaimer, the term of this patent is extended or adjusted under 35 U.S.C. 154(b) by 195 days.

(21) Appl. No.: 11/446,173

(22) Filed: Jun. 5, 2006

(65) Prior Publication Data

US 2006/0273637 A1  Dec. 7, 2006

(30) Foreign Application Priority Data

Jun. 6, 2005  (JP)  ............................. 2005-165845
Jun. 6, 2005  (JP)  ............................. 2005-165853

(51) Int. Cl.
*A47C 1/11* (2006.01)
(52) U.S. Cl. ..................................... 297/250.1; 297/484
(58) Field of Classification Search .............. 297/250.1, 297/256, 484, 483, 411.2
See application file for complete search history.

(56) References Cited

U.S. PATENT DOCUMENTS

| 4,569,537 | A | * | 2/1986 | Else ......................... 280/801.2 |
|---|---|---|---|---|
| 4,854,639 | A | * | 8/1989 | Burleigh et al. .......... 297/250.1 |
| 5,263,741 | A | * | 11/1993 | Seros et al. ................. 280/808 |
| 5,441,332 | A | * | 8/1995 | Verellen ..................... 297/483 |
| 5,460,410 | A | * | 10/1995 | Petzi et al. ............... 280/801.2 |
| 6,592,180 | B2 | * | 7/2003 | Combs .................. 297/188.14 |
| 6,669,302 | B2 | * | 12/2003 | Warner et al. ............... 297/483 |
| 6,811,186 | B1 | * | 11/2004 | Fraley et al. ............. 280/801.2 |
| 6,908,151 | B2 | * | 6/2005 | Meeker et al. ........... 297/250.1 |
| 7,055,903 | B2 | * | 6/2006 | Balensiefer et al. .... 297/256.11 |
| 7,232,185 | B2 | * | 6/2007 | Hartenstine et al. ...... 297/250.1 |
| 2007/0246982 | A1 | * | 10/2007 | Nett et al. ................ 297/250.1 |
| 2008/0023993 | A1 | * | 1/2008 | Vertegaal ................. 297/250.1 |

FOREIGN PATENT DOCUMENTS

JP  10-100762 A  4/1998
JP  2002-120614 A  4/2002

* cited by examiner

*Primary Examiner*—David Dunn
*Assistant Examiner*—James Alex
(74) *Attorney, Agent, or Firm*—Young & Thompson

(57) ABSTRACT

In a child seat which has a seat portion and a back portion and in which the back portion provided with a shoulder belt guide for guiding a shoulder belt of a seat belt of a vehicle from the shoulder to the chest of a sitter, the child seat is provided with a belt guide position adjusting mechanism for changing the position of the shoulder belt guide in the left and right directions of the back portion.

4 Claims, 13 Drawing Sheets

CHILD SEAT, VENTILATION PORTION STRUCTURE OF ARTICLE AND COVER OF ARTICLE COMPRISING THE VENTILATION PORTION STRUCTURE, AND ARTICLE FOR CHILD

BACKGROUND OF THE INVENTION

1. Field of the Invention

The present invention relates to a child seat mounted on a vehicle seat in order to fit a child into a seat belt of a vehicle and a ventilation portion structure provided on a surface of an article such as the child seat.

2. Description of the Related Art

As a child seat for fitting an infant or a child into a vehicle seat, there are known a type of restricting a sitter with a seat belt of the child seat by fixing the child seat to the vehicle seat by the use of a seat belt or a ISOFIX fixing mechanism of the vehicle and a type of placing the child seat on the vehicle seat and restricting the sitter to the child seat with the seat belt of the vehicle. Generally, while the former type child seat is used for newborn babies to infants of 4 years, or infants with the weight of about 18 kg, the latter type child seat is used for children with the weight of 15 kg to 36 kg or 3 to 7 years (11 years in some cases). As the latter type child seat, there is provided a child seat having a seat portion and a back portion detachably connected to the seat portion, in which a headrest is provided at the upper end of the back portion to be adjustable in the vertical direction, and shoulder belt guides for guiding a shoulder belt of a 3-point seat belt of a vehicle from around the shoulder to the breast of the sitter are provided on both sides of the back portion to be adjustable in the vertical direction together with the headrest (for example, see Japanese Patent Application Laid-Open (JP-A) No. 2002-120614).

In the child seat for restricting the upper half of the sitter by the use of the shoulder belt of the vehicle, it is necessary to guide the shoulder belt so as not to come in contact with the neck of the sitter and not to depart from the shoulder of the sitter. However, in the conventional child seat, since the position of the shoulder belt guide is constant in the left and right directions, the adjustable range of the guide position of the shoulder belt by the should belt guides is limited in the left and right directions, and thus the range where the back portion can be used properly is also limited.

As an article for children such as a child seat, there has been suggested an article having a ventilation portion structure in which a ventilation property is given to the cushion member as a built-in member and the surface of a cushion member is covered with a ventilating cloth such as a mesh cloth for preventing steam cased by sweat of a user (a sitter) (for example, see JP-A No. 10-100762) and products having such a ventilation portion structure have come to the market.

When the ventilation portion structure as described above is provided in a part of the article, a method of suturing the end of the epidermal material of the article and the end of the mesh material is generally performed. However, the epidermal material and the ventilating cloth are positioned at the same height in the suturing structure. Accordingly, the ventilating cloth comes in direct contact with the user and sometimes the sufficient ventilation effect cannot be ensured. Specifically, in the article for children, since a sweating countermeasure is more important than in an adult article, the ventilation portion structure having a higher ventilation effect is required.

SUMMARY OF THE INVENTION

The present invention is contrived in consideration of the above-mentioned circumstances. The first object of the invention is to provide a child seat which can sufficiently enlarge the adjustment range of the guide position of the shoulder belt by the shoulder belt guide in the left and right directions. The second object of the invention is to provide a ventilation portion structure of an article which can provide a higher ventilation effect, and a cover of an article, a child article and a child seat using the ventilation portion structure.

To achieve the first object, a child seat of a first aspect of the present invention has a seat portion and a back portion in which the back portion is provided with a shoulder belt guide for guiding a shoulder belt of a seat belt of a vehicle from the shoulder to the chest of a sitter, the child seat comprising: a belt guide position adjusting mechanism for changing the position of the shoulder belt guide in the left and right directions of the back portion.

According to the child seat of the first aspect, since the position of the shoulder belt guide can be adjusted in the left and right directions, the range for adjusting the guide position of the shoulder belt by the shoulder belt guide can easily extend in the left and right directions. As a result, the shoulder belt guide can be fitted into various sizes of the body of a user and thus a range in which the back portion can be used properly can be extended.

In one embodiment of the child seat according to the first aspect of the present invention, the shoulder belt guide is movably mounted in the left and right directions relative to the body of the back portion, wherein the belt guide position adjusting mechanism comprises a slider which can be integrally moved with the shoulder belt guide in the left and right directions, a restricting member which can be moved between a restriction position adjacent to the slider and a restriction releasing position separated from the slider, a biasing member for biasing the restricting member toward the restriction position, and a manipulating member having a manipulating portion exposed on the outer surface of the back portion and make the restricting member move from the restriction position to the restriction releasing position by manipulating the manipulating portion, and wherein a lock protrusion is provided on any one of the slider and the restricting member, and a plurality of lock receiving portions, which is engaged with the lock protrusion when the restricting member is disposed at the restriction position and is released from the lock protrusion when the restricting member is disposed at the restriction releasing position, is provided on the other of the slider and the restricting member in line along the left and right directions.

According to this embodiment, when the restricting member is held at the restriction position by the biasing member, the lock protrusion and the lock receiving portion are engaged with each other to restrict the slider in the left and right directions and thus the shoulder belt guide is held at a predetermined position about the left and right directions. When the restricting member is moved to the restriction releasing position by manipulating the manipulating member, the lock protrusion escapes from the lock receiving portion to release the restriction of the slider. In this state, the shoulder belt guide is manipulated in the left and right directions to change the lock receiving portion to be engaged with the lock protrusion and the restricting member returns to the restriction position, thereby the lock protrusion is engaged with the lock receiving portion different from the above and the shoulder belt guide is held at a different position in the left and right directions. Therefore, it is possible to adjust the position of the shoulder belt guide.

In the above embodiment, a base portion of the shoulder belt guide is disposed at the rear surface side of the back portion, a guide groove for receiving the base portion of the shoulder belt guide is provided in the body of the back portion, the slider is embedded in the body of the back portion so as to be located at the front side of the back portion relative to the base portion, the slider and the shoulder belt guide are connected to each other through a connection shaft which penetrates through an elongated hole of the left and right directions provided in the body of the back portion, the restricting member is embedded in the body so as to face the slider from the rear side of the back portion, the lock protrusion and the lock receiving portions are provided between the facing surfaces of the slider and the restricting member, and the manipulating member is connected to the restricting member such that the manipulating portion is exposed to the rear surface of the back portion and the manipulating portion and the restricting member can be integrally moved in the front and rear directions of the back portion.

According to this configuration, the manipulating portion of the manipulating member is pulled backward at the rear surface of the back portion and the restricting member is separated from the slider to be moved to the restriction releasing position, thereby the restriction of the shoulder belt guide is released and the position thereof in the left and right directions can be changed. The slider and the restricting member are disposed in the body and the manipulating portion of the manipulating member is exposed to the rear surface of the back portion, there is no risk that the parts is in contact with the sitter and comfort of the sitter is not damaged and stability is high. In addition, since most of the belt guide position adjusting mechanism is hidden in the back portion, the appearance of the child seat can be improved.

In the above embodiment, an expanding portion which expands toward the front side of the back portion further away from the base portion outward in the left and right directions of the base portion is provided on the shoulder belt guide, a deep groove portion which receives the expanding portion when the shoulder belt guide is drawn inward in the left and right directions is provided in the guide groove of the back portion, a rib is provided in the deep groove portion, and a relief groove for receiving the rib is provided in the expanding portion. According to this configuration, while the base portion of the shoulder belt guide is disposed at the rear surface of the back portion, the shoulder belt guide is made to be extended to the front side of the back portion by the expanding portion and the guide position of the shoulder belt can be made to be approximated to the shoulder of the sitter. Since the deep groove portion for receiving the expanding portion is provided in the guide groove of the back portion, the rib is provided in the deep groove portion, and the relief groove for receiving the rib is provided in the expanding portion, even when the shoulder belt guide is pulled outward in the left and right directions, the step portion between the expanding portion and the base portion is not exposed from the back portion until the expanding portion escapes from the deep groove portion, and a gap in which a finger may be caught is not generated between the step portion and the back portion. In addition, by providing the rib in the deep groove portion, it is possible to prevent the finger or an extraneous material from being inserted into the deep groove.

In the child seat of another embodiment of the present invention, the shoulder belt guide is movably mounted in the left and right directions relative to the body of the back portion, wherein the belt guide position adjusting mechanism comprises a disk-shaped restricting member which is provided on the body of the back portion in a rotatable state about an axis which extends in the front and rear directions of the back portion, links which are rotatably connected to the restricting member and the shoulder belt guide respectively, and a manipulating member which has a manipulating portion exposed on the outer surface of the back portion and rotates the restricting member by manipulating the manipulating portion, and wherein a lock protrusion is provided on any one of the restricting member and the body of the back portion, and a plurality of lock receiving portions, which can be engaged with the lock protrusion, is provided on the other of the restricting member and the body of the back portion in the rotation direction of the restricting member According to the above embodiment, by rotating the restricting member, the orientation of the link is changed and the shoulder belt guide is moved in the left and right directions. The lock protrusion is engaged with any one of the lock receiving portions, the restricting member is held at a predetermined position in a circumferential direction, and thus the shoulder belt guide can be held at a predetermined position. By changing the lock receiving portion to be engaged with the lock protrusion, the shoulder belt guide can be held at a different position. Accordingly, the position of the shoulder belt guide can be adjusted.

In the child seat of according to the first embodiment of the present invention, the back portion may comprise a backrest which supports the back of the sitter and a headrest which is provided such that the position thereof can be adjusted relative to the backrest in the upper and lower directions supports the head of the sitter, and the shoulder belt guide and the belt guide position adjusting mechanism are provided in the headrest.

According to this configuration, the position of the shoulder belt guide can be adjusted in the left and right directions or the upper and lower directions. Accordingly, the range for adjusting the position of the shoulder belt by the shoulder belt guide more extend, and the shoulder belt guide is made to be fitted into various sizes of the body of a user and thus a range for properly using the back portion can be further extended.

To achieve the above-described second object, a ventilation portion structure according to one embodiment of the present invention is a ventilation portion structure provided in a surface of an article which is in contact with a user, comprising: an epidermal material which has a notch portion for forming a ventilation portion and in which the edge of the notch portion is folded back toward the rear surface thereof; a ventilation bottom material disposed at the rear surface of the notch portion of the epidermal material to configure the bottom surface of the ventilation portion; and a gusset material interposed between the folded edge of the epidermal material and the bottom material in a folded state such that a folded line is directed to the inner circumference of the notch portion, wherein the edge of the epidermal material and the bottom material are connected to each other through the gusset material.

According to the ventilation portion structure related to one aspect of the present invention, since the gusset material is interposed between the epidermal material and the bottom material in a folded state, the bottom material more retreats than the epidermal material and thus an vertical interval is generated between the epidermal material and the bottom material. In addition, since the tension of the epidermal material is cushioned by the folded gusset material to be hard to be delivered to the bottom material, a phenomenon that the bottom material is pulled outward by the tension of the epidermal material and thus the bottom material is lifted up is reduced. As a result, by increasing the depth of the ventilation portion from the surface of the epidermal material to the bottom surface composed of the bottom material, it is possible to generate a gap between the bottom material and a user and to increase the ventilation effect. By retreating the bottom material from the epidermal material, the user can be positioned in the ventilation portion.

In the ventilation portion structure of the present invention the epidermal material may comprise an outer cloth and a cushion material adhered to the rear surface of the outer cloth. According to such a configuration, since the cushion material overlaps by folding the edge of the epidermal material, the depth from the epidermal material to the bottom material increases and thus the ventilation effect can more increase.

In the ventilation portion structure of the present invention the bottom material may comprise a mesh cloth and a cushion material adhered to the rear surface of the mesh cloth, and a through hole is formed in the cushion material of the bottom material. According to this configuration, the cushion effect can be obtained while ensuring the ventilation in the bottom portion of the ventilation portion and thus the comfort is not damaged even when the user is in contact with the bottom surface of the ventilation portion.

In the present invention, each of the epidermal material and the bottom material, and the gusset material may be connected to one another by various methods. In the preferable embodiment, a single gusset material is interposed between the epidermal material and the bottom material, the folded edge of the epidermal material and one of the folded portions of the gusset material are sewed, and the bottom material and the other folded portion of the gusset material are sewed. According to this configuration, it is possible to form the ventilation portion structure using the same method as that of a case of sewing the epidermal material and the mesh cloth. Since the sewed point is hidden by the rear side of the folded portion of the gusset portion in the ventilation portion, the appearance quality of the ventilation portion is highly maintained to improve its appearance.

The ventilation portion structure of the present invention is applicable to various articles or the covers thereof. For example, in the cover disposed on a surface of the article, the ventilation portion structure of the present invention can be formed in a surface which is in contact with a user. In a child article comprising a surface which is in contact with a child, the ventilation portion structure of the present invention can be formed in the surface which is in contact with the child. In a child seat, the ventilation portion structure of the present invention can be formed in the substantially central portion in the left and right directions of the cover disposed on a surface which is in contact with a sitter. In this case, in addition to the ventilation effect, a child who sits on the child seat can be held in the groove of the ventilation portion. Accordingly, the child, as a sitter, is positioned in the substantially central portion in the left and right directions of the child seat to be held at a right posture.

In the child seat comprising the ventilation portion structure according to the present invention, the child seat may have a seat portion and a back portion, and bodies and covers for covering the bodies are provided in the seat portion and the back portion respectively. According to this configuration, a child can be held in the substantially central portions of the left and right directions of the covers of the seat portion and the back portion while improving the ventilation effect. The back portion is provided with a backrest which supports the back of the sitter and a headrest which supports the head of the sitter, and substantially central portions of the left and right directions of the respective covers for covering the backrest and the headrest is provided with ventilation portion structures. According to this aspect, the hip, the back and the head of a sitter can be positioned in the substantially central portions of the left and right directions and thus posture of the sitter can be more held.

DESCRIPTION OF THE PREFERRED EMBODIMENT

Figure 1:
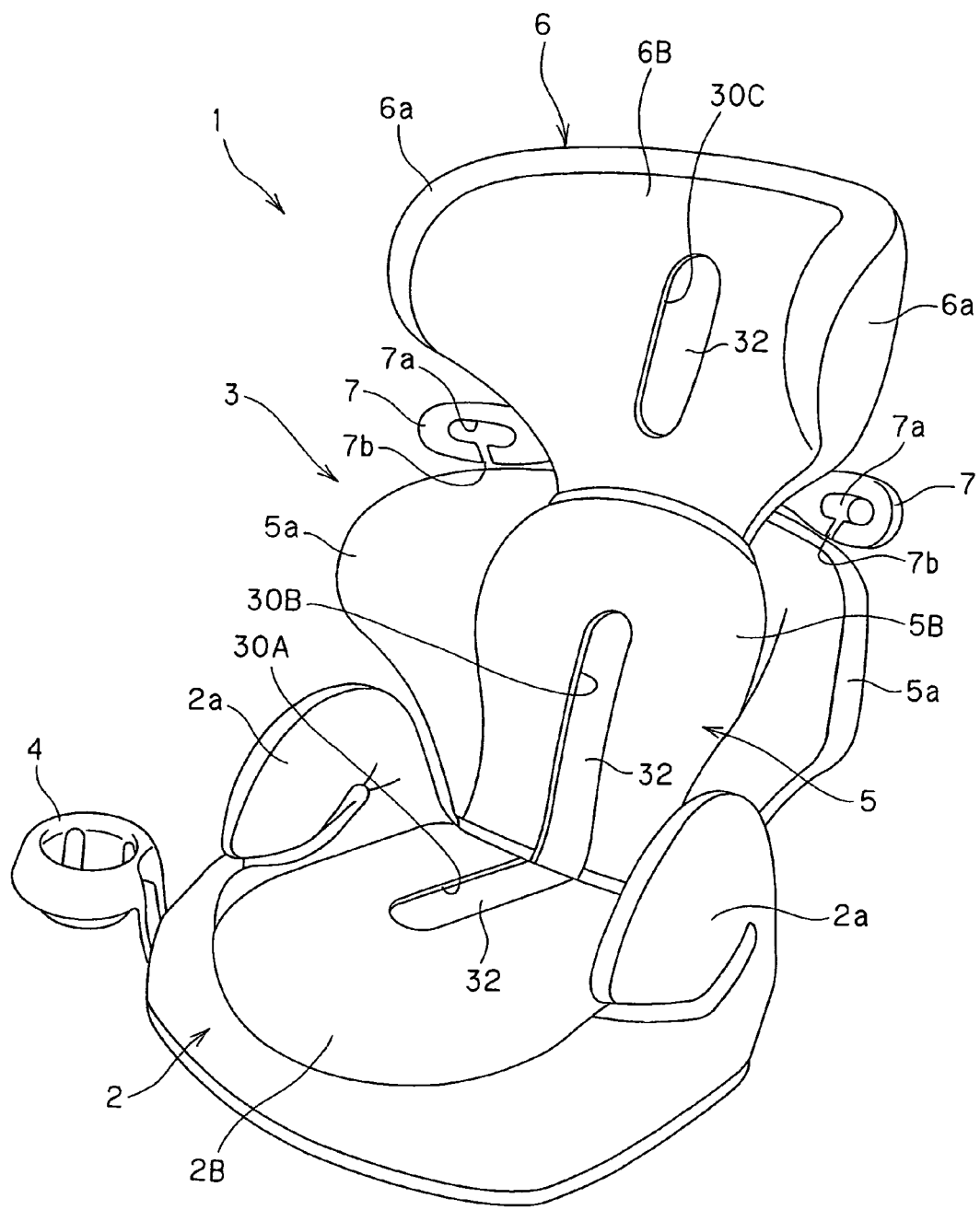
FIG. 1 is a perspective view of a child seat according to an embodiment of the present invention.

FIG. 1 shows a child seat according to an embodiment of the present invention. The child seat 1 includes a seat portion 2 and a back portion 3 connected to the rear end of the seat portion 2. The seat portion 2 is a portion on which an infant or a child sit as a sitter and waist belt guides 2a for correctly positioning a waist belt of a seat belt of a vehicle at the waist of the sitter are provided integrally on both sides of the seat portion 2. A drink holder 4 in which a drink bottle is put is mounted at the front side of the seat portion 2.

Figure 2:
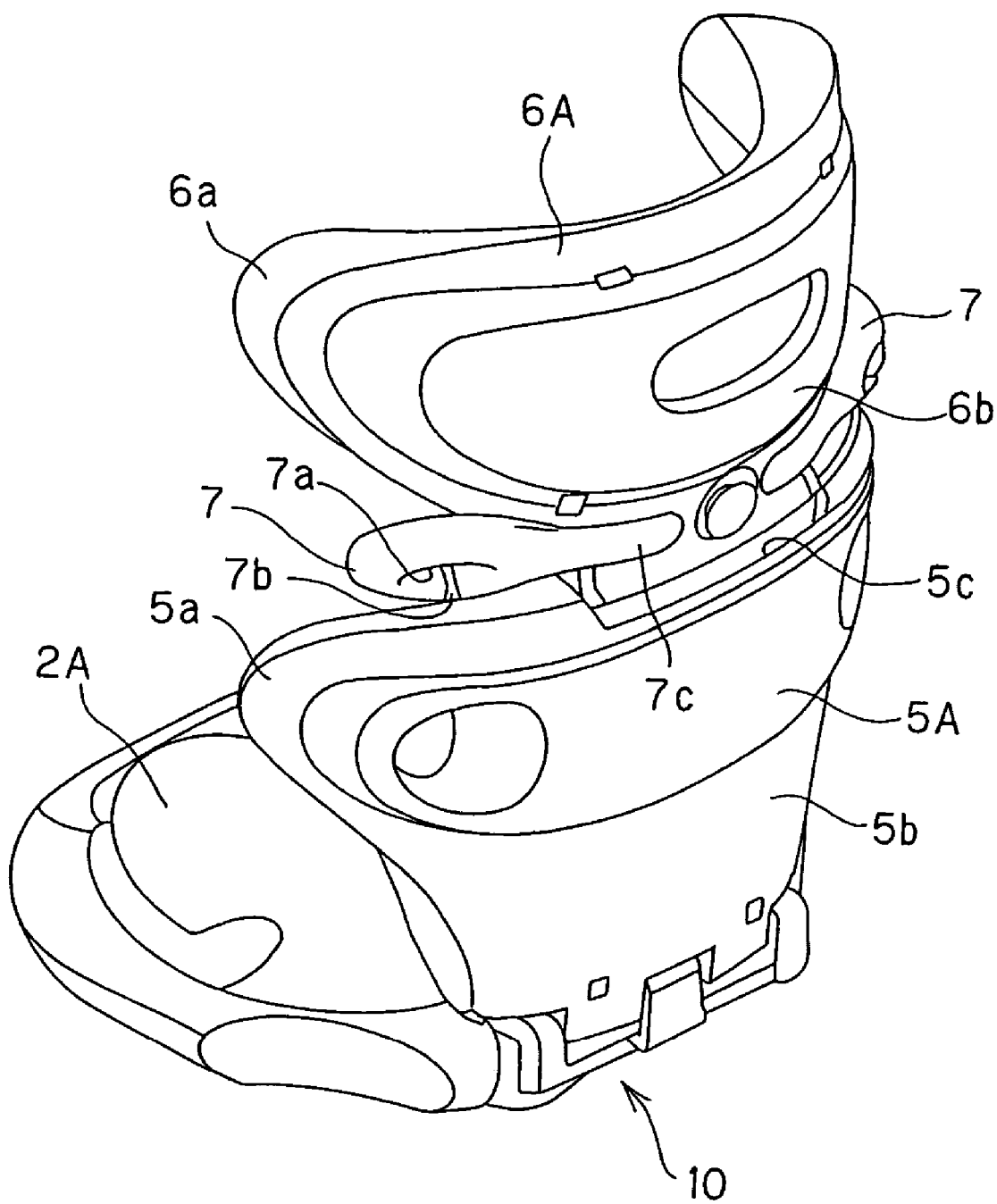
FIG. 2 is a perspective view showing a state where a cover is detached from the child seat of FIG. 1 to expose the body of each portion.

The back portion 3 comprises a backrest 5 for supporting the back of the sitter and a headrest 6 disposed at the upper end of the backrest 5. Side supports 5a and 6a for supporting the body or the head of the sitter at the sides thereof are disposed integrally with the backrest 5 and the headrest 6 respectively. A seat body 2A, a backrest body 5A, and a headrest body 6A, which are made of resin and shown in FIG. 2 are included inside of the seat portion 2, the backrest 5, and the headrest 6 respectively. The bodies 2A, 5A, and 6A are covered with covers 2B, 5B, and 6B respectively, as shown in FIG. 1. Shoulder belt guides 7 are provided on both lower sides of the headrest 6.

Figure 3:
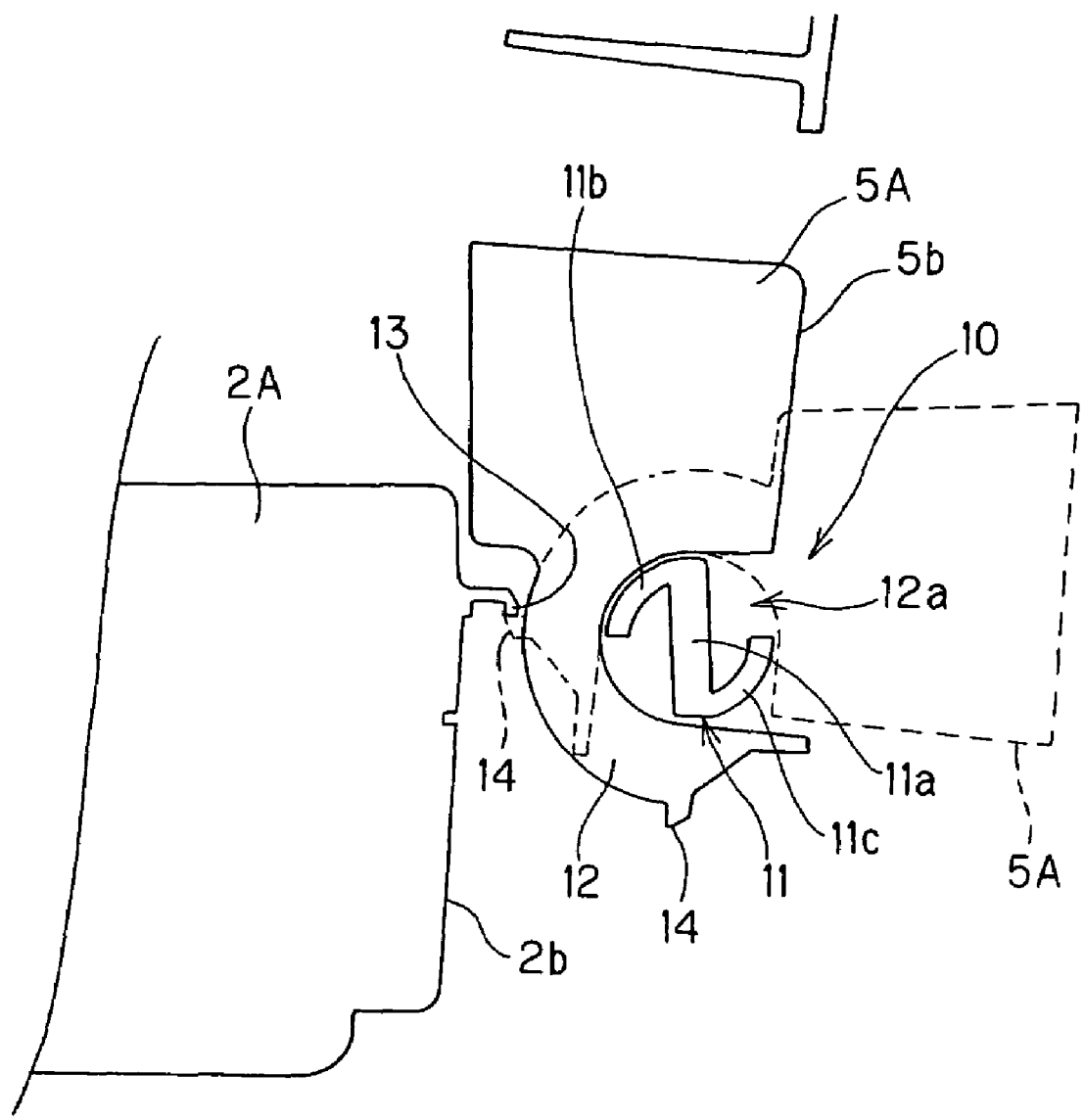
FIG. 3 is a view showing a mechanism for connecting a seat body with a backrest body.

The seat portion 2 and the back portion 3 are rotatably connected to each other through a connecting mechanism 10 interposed between the seat body 2A and the backrest body 5A. The detailed structure of the connecting mechanism 10 is shown in FIG. 3. The connecting mechanism 10 has a spindle 11 provided integrally with the seat body 2A, a hook 12 provided integrally with the lower end of the backrest body 5A, a stopper 13 protruded from the rear end 2b of the seat body 2A to the spindle 11, and a protrusion 14 provided on the outer circumference of the hook 12. The spindle 11 extends in the left and right directions of the child seat 1 in the rear end of the seat body 2A. The spindle 11 has a flat base portion 11a which extends in a diameter direction of the spindle 11 in a section perpendicular to the axial direction thereof and a pair of curved portions 11b and 11c which is circumferentially in an arc shape curved from both ends of the base portion 11a. The curved portions 11b and 11c are disposed at the front and back sides of the base portion 11a toward the front and back sides of the seat body 2A respectively.

The hook 12 is formed in a substantially semi-cylindrical shape and has an opening 12a provided toward the rear surface 5b of the backrest body 5A. A gap between the outer circumferential surface of the spindle 11 and the stopper 13 is set to be slightly larger than the thickness of the hook 12. As denoted by a solid line in FIG. 3, when the backrest body 5A is in a using position in which the backrest body 5A is raised upwardly relative to the seat body 2A, the opening 12a of the hook 12 is directed to the back side and the hook 12 is inserted between the spindle 11 and the stopper 13. In this state, the hook 12 cannot be detached from the spindle 11 due to the stopper 13. At this time, the protrusion 14 formed on the outer circumference of the hook 12 is located at the lower side of the hook 12.

As denoted by a dotted line in FIG. 3, when the backrest body 5A falls down at a detachment position which extends substantially straightly from the back side of the seat body 2A, the opening 12a of the hook 12 is directed to the bottom and the protrusion 14 is brought into contact with the stopper 13. In this state, when the hook 12 is lifted up relative to the spindle 12, the stopper 13 is elastically deformed, and the protrusion 14 passes over the stopper 13. Accordingly, the hook 12 can be pulled up relative to the spindle 11 to separate the backrest body 5A from the seat body 2A. When the hook 12 is pushed down from above relative to the spindle 11 while the backrest body 5A is maintained at the detachment position, the stopper 13 is elastically deformed, the protrusion 14 passes over the stopper 13, and the spindle 11 is inserted into the hook 12. Accordingly, the spindle 11 and the hook 12 engage with each other and the backrest body 5A is rotatably connected to the seat body 2A around the spindle 11. The rigidity of the curved portion 11b is set such that the curved portion 11b of the spindle 11 is also elastically deformed together with the stopper 13 when the spindle 11 and the hook 12 are detached from each other.

Figure 4:
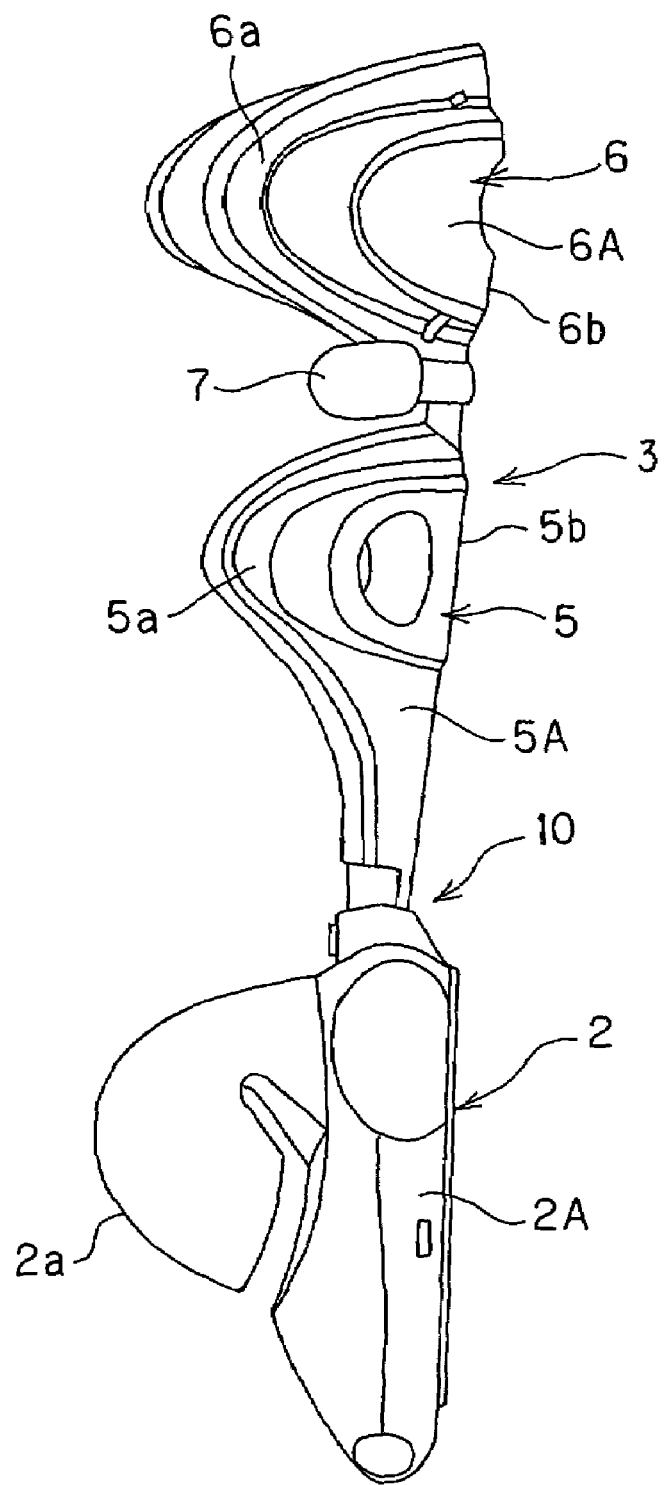
FIG. 4 is a view showing a state of suspending a seat portion in a condition that a back portion is disposed at the top thereof.

In the connection mechanism 10 described above, since the seat portion 2 and the back portion 3 elastically engage with each other relative to the detachment and attachment direction therebetween in the state where the backrest body 5A falls down to the detachment position and thus the stopper 13, in some case include the curved portion 11b of the spindle 11, can be elastically deformed, it is possible to prevent unintended detachment between the seat portion 2 and the back portion 3. For example, when the back portion 3 is manipulated to lift up the child seat 1, as shown in FIG. 4, the seat portion 2 is hung on the back portion 3 and the relationship between the spindle 11 and the hook 12 becomes in the state denoted by a dotted line in FIG. 3. In this state, since the stopper 13 is collided with the protrusion 14 and thus the detachment of the stopper from the hook 12 of the spindle 11 is suppressed, the seat portion 2 is not detached from the back portion 3.

The present invention will be described, returning to FIG. 2. A support fitting groove 5c upwardly opened is provided in the backrest body 5A, and the headrest body 6A is fitted to the support fitting groove 5c to be slidable in the upper and lower directions. A headrest positioning mechanism (not shown) for restricting the headrest body 6A to a proper position in the upper and lower directions is provided between the backrest body 5A and the headrest body 6A. Accordingly, the position of the headrest 6 can be adjusted in the upper and lower directions with respect to the backrest 5. By fitting the shoulder belt guides 7 to the headrest body 6A, the positions of the shoulder belt guides 7 can be adjusted in the upper and lower directions along with the headrest 6. A known mechanism can be properly used as the headrest positioning mechanism.

The shoulder belt guides 7 serve to guide the shoulder belt of the seat belt of the vehicle from around the shoulders of the sitter toward the breast. As shown in FIG. 1, the shoulder belt guide 7 comprises a shoulder belt guide hole 7a through which the shoulder belt passes and a slit 7b for allowing the shoulder belt to enter and exit from the shoulder belt guide hole 7a. By attaching the shoulder belt guides 7 to the headrest body 6A through a belt guide positioning mechanism 20 shown in FIGS. 5 to 9, the position of the shoulder belt guides 7 can be adjusted in the left and right directions of the child seat 1.

Figure 5:
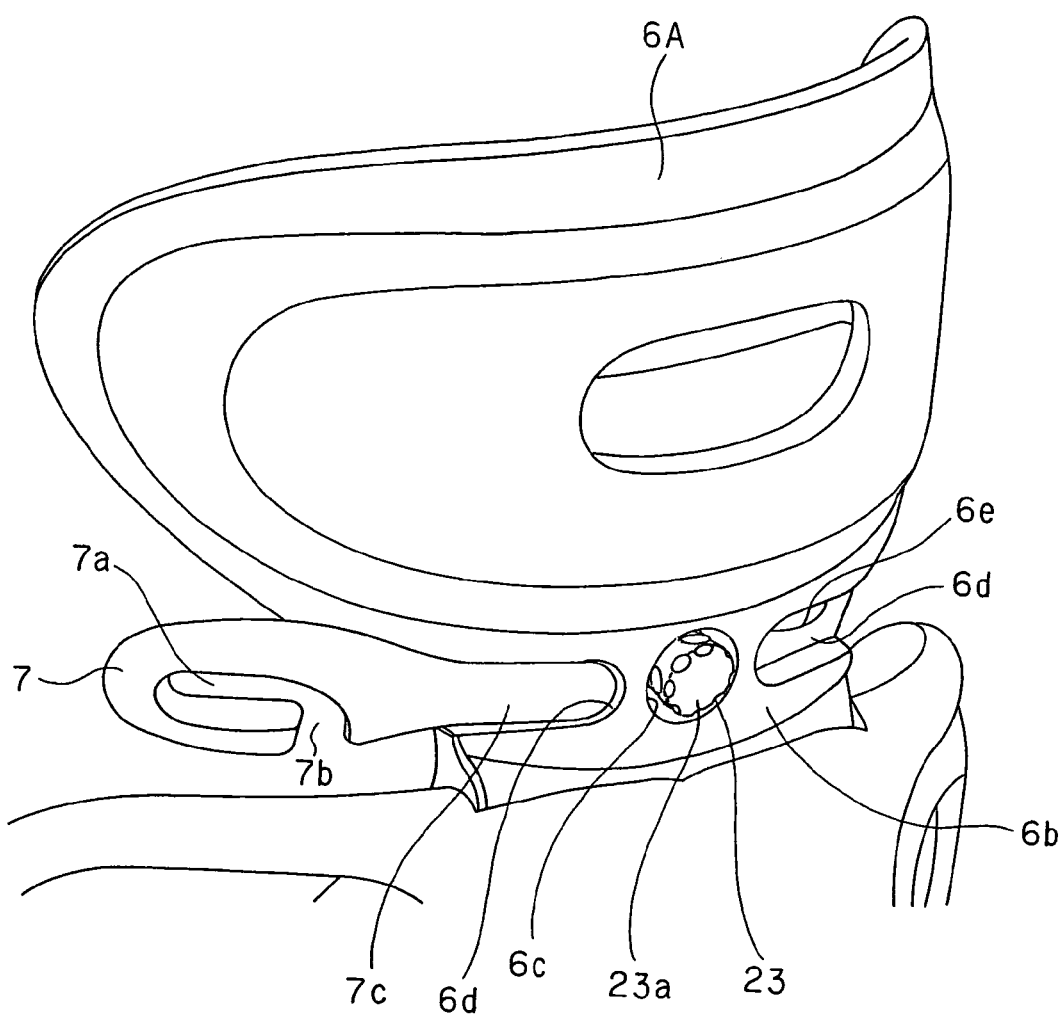
FIG. 5 is a perspective view of a headrest body when viewed from the rear surface thereof.
Figure 6:
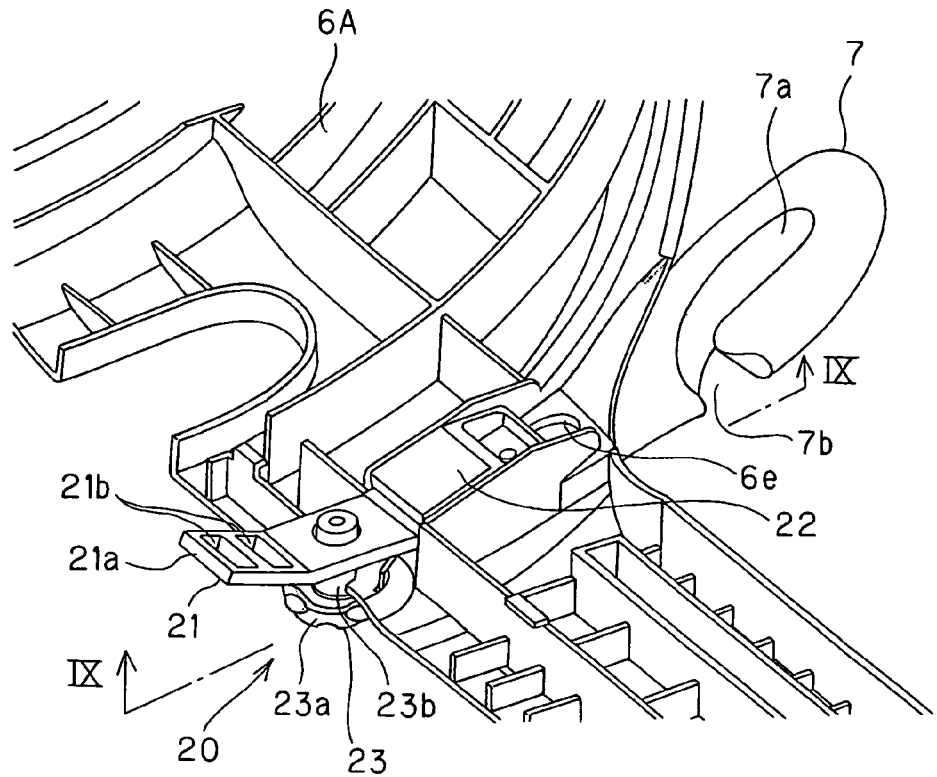
FIG. 6 is a view showing a belt guide mechanism mounted in the headrest body.
Figure 7:
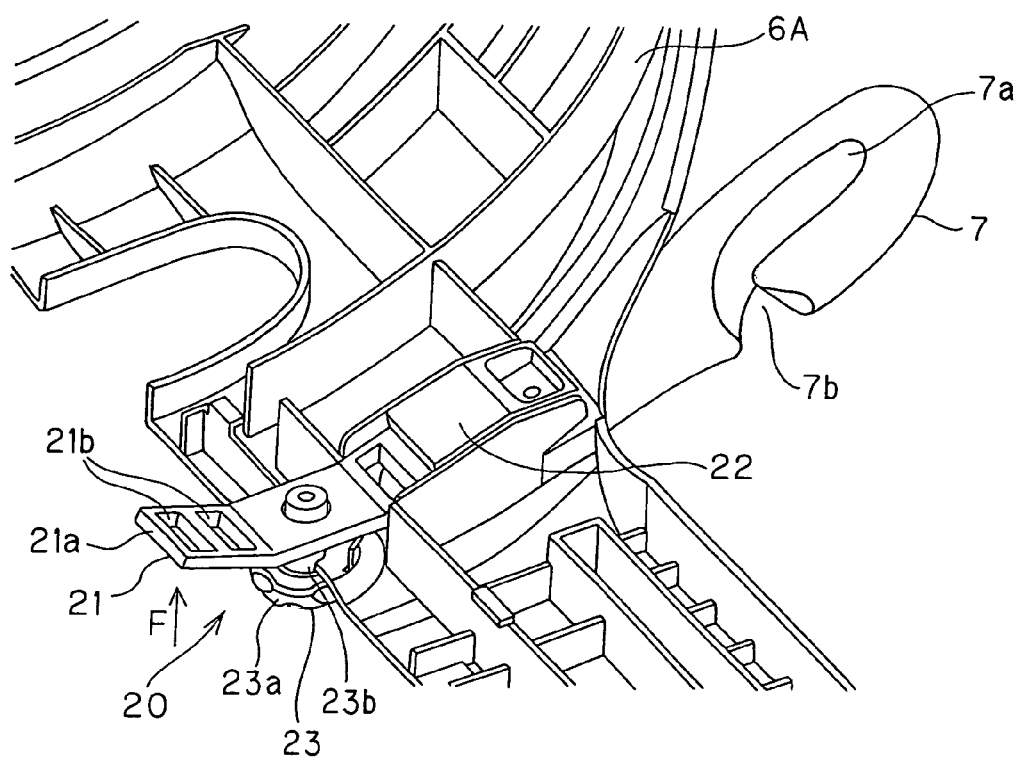
FIG. 7 is a view showing a state of moving a shoulder belt guide outward in the state shown in FIG. 6.
Figure 8:
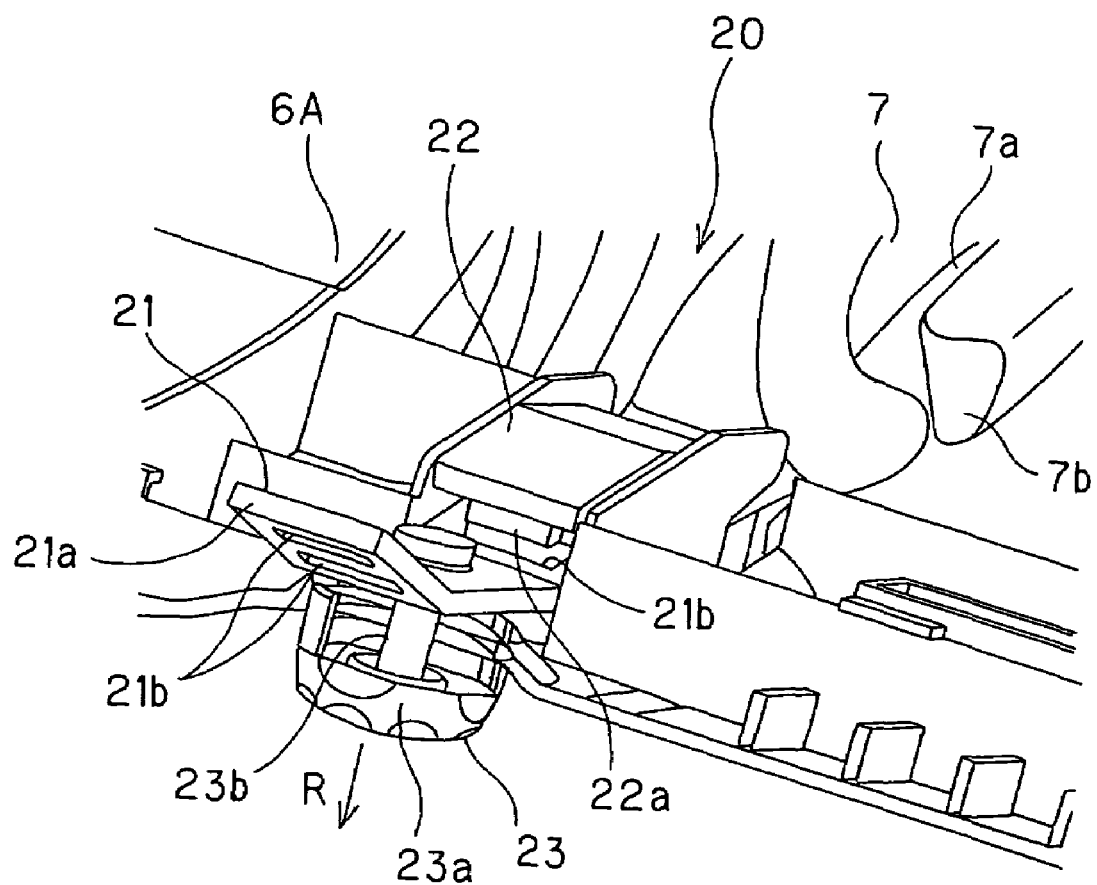
FIG. 8 is a view showing a state where a lock plate is pulled down to release restriction of the shoulder belt guide.
Figure 9:
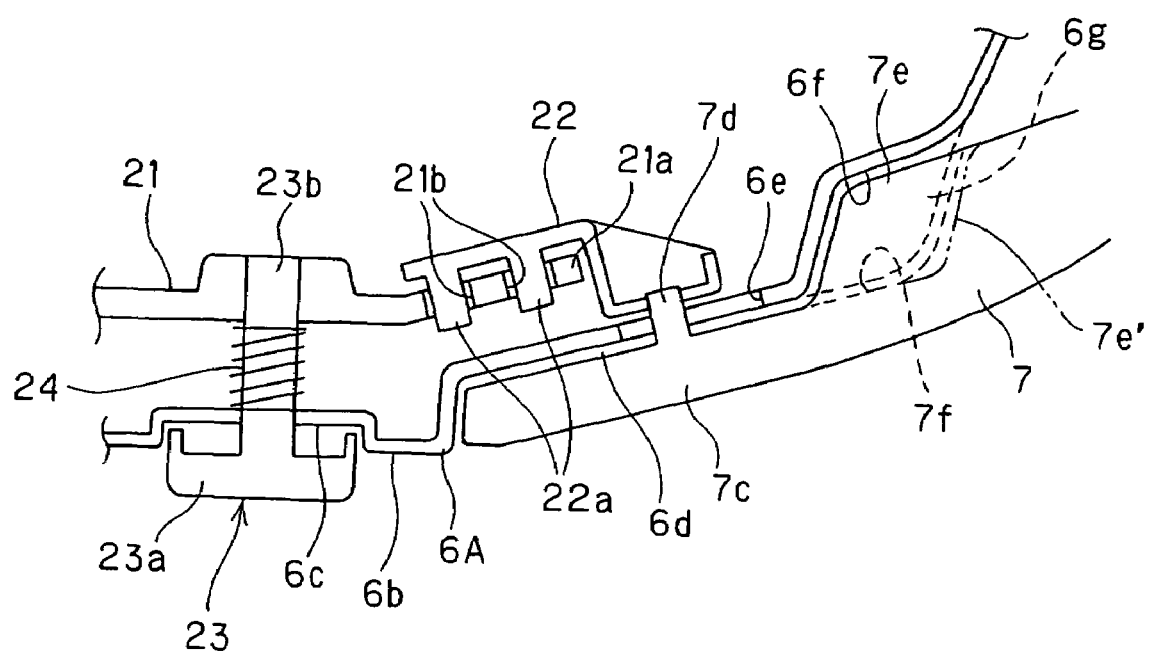
FIG. 9 is a cross-sectional view of the belt guide mechanism taken along the line IX-IX of FIG. 6.

Next, the belt guide positioning mechanism 20 will be described in detail with reference to FIGS. 5 to 9. FIG. 5 illustrates a view of the shoulder belt guides 7 as seen from the rear surface 6b of the headrest body 6A, FIGS. 6 to 8 illustrate parts of the belt guide positioning mechanism 20 disposed inside the headrest body 6A, and FIG. 9 illustrates a section of the belt guide positioning mechanism 20 taken along the line IX-IX of FIG. 6. As shown in the figures, the belt guide positioning mechanism 20 comprises a lock plate 21 as a restriction member provided inside the headrest body 6A, a pair of sliders 22 (only one is shown in FIGS. 7 to 9) which is formed to correspond to the shoulder belt guides 7 inside the headrest body 6A and engages with the lock plate 21, and an unlocking knob 23 as a manipulating member for manipulating the lock plate 21.

A lock portion 21a which is inserted between the right and left sliders 22 and the headrest body 6A and is opposed to the slider 22 at the rear side of the back portion 3 is provided in the lock plate 21. In each lock portion 21a, a plurality of (two in the figures) lock holes 21b as a lock receiving portion is provided with a constant pitch in the positioning direction (the left and right directions of the child seat 1) of the shoulder belt guide 7. Lock protrusions 22a engaging with the lock holes 21b are provided in the same number and same pitch as the lock holes 21b in the left and right directions in the sliders 22. A base 7c of the shoulder belt guide 7 is fit into the guide groove 6d provided in the headrest body 6A to be movable in the left and right directions. A connection axis 7d is provided in the shoulder belt guides 7 and the connection axis 7d is connected to the slider 22 inside the headrest body 6A through an elongated hole 6e formed in the bottom portion of the guide groove 6d. Accordingly, inside the headrest body 6A, the sliders 22 are movable in the left and right directions integrally with the shoulder belt guide 7. Spaces in which the lock portions 21A are movable in the front and back directions between a restriction position (the position shown in FIGS. 6 and 9) where the lock holes 21b engage with the lock protrusions 22a and a restriction release position where the lock holes 21b disengage with the lock protrusions 22a are provided between the sliders 22 and the headrest body 6A.

The unlocking knob 23 has a manipulation portion 23a which is exposed to the outer surface of the back portion 3 by disposing inside a concave portion 6c provided at the lower center of the rear surface 6b of the headrest body 6A, and an axis portion 23b which extends from the rear center of the manipulation portion 23a to the inside of the headrest body 6A. The fore end of the axis portion 23b is connected to the lock plate 21, and thus the lock plate 21 and the unlocking knob 23 are integrally movable in the axis direction of the axis portion 23b, that is, in the front and back directions of the back portion 3. A coil spring 24 (shown in only FIG. 9) as a biasing means is fit into the outer circumference of the axis portion 23b. The lock plate 21 is biased to the front direction (in the arrow F direction in FIG. 7) of the headrest body 6A by the coil spring 24, and thus the lock plate 21 is maintained at the restriction position where the lock holes 21b engage with the lock protrusions 22a. By allowing the lock holes 21b to engage with the lock protrusions 22a, the slider 22 is restricted in the left and right directions to the lock plate 21 and thus the shoulder belt guide 7 cannot move in the left and right directions.

In the belt guide positioning mechanism 20 described above, in order to vary the position of the shoulder belt guide 7 in the left and right directions, the manipulation portion 23a of the unlocking knob 23 is pulled to the back side of the headrest 6 as indicated by the arrow R in FIG. 8 and the lock plate 21 is moved to the restriction release position where the lock holes 21b disengage from the lock protrusions 22a of the slider 22. Accordingly, the restriction of the slider 22 to the lock plate 21 is released and the shoulder belt guide 7 is moved in the left and right directions along the guide groove 6d, thereby the position thereof can be varied. As shown in FIG. 9, when two lock holes 21b engage with the lock protrusions 22a respectively, the shoulder belt guide 7 is restricted to a position retreated to the inside in the left and right directions. When the shoulder belt guide 7 is pulled to the outside by retreating the lock plate 21 to the restriction releasing position from the state shown in FIG. 9 and thus the inner lock protrusions 22a engage with the outer lock holes 21b as shown in FIG. 7, the shoulder belt guide 7 can be restricted to a position protruded outwardly from the position shown in FIG. 9. In the figure, by providing two lock holes 21b and two lock protrusions 22a, the position of the shoulder belt guide 7 can be adjusted between the two positions. However, the number may be increased so as to adjust the position of the shoulder belt guide 7 in more steps. Alternatively, only one lock protrusion 22a may be provided and a plurality of lock holes 21b may be provided. The lock protrusions 22a may be provided in the lock plate 21 and the lock holes 21b as the lock receiving portions may be provided in the slider 22. In this case, the number of lock protrusions 22a may be one or more and the number of lock holes 21b may be formed to correspond to the number of positions where the shoulder belt guide 7 should be maintained. The lock receiving portion is not limited to the through hole, but may be a concave portion.

Figure 10A:
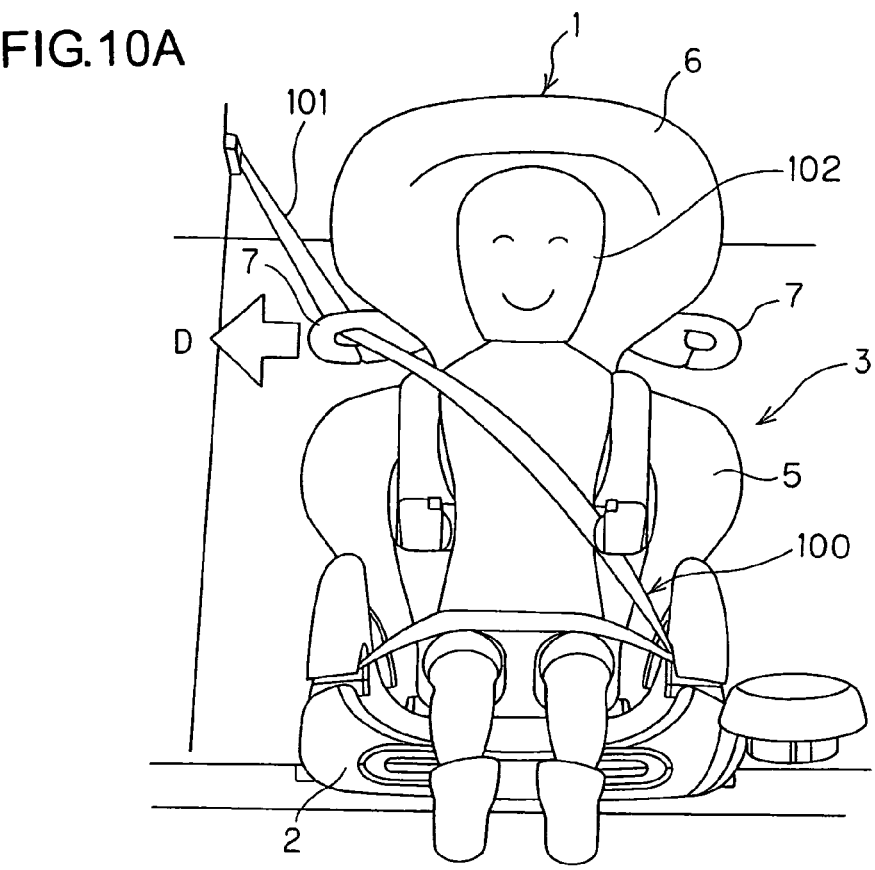
FIG. 10A is a view showing a state where the shoulder belt guide is pulled outward to properly adjust the guide position of the shoulder belt.
Figure 10B:
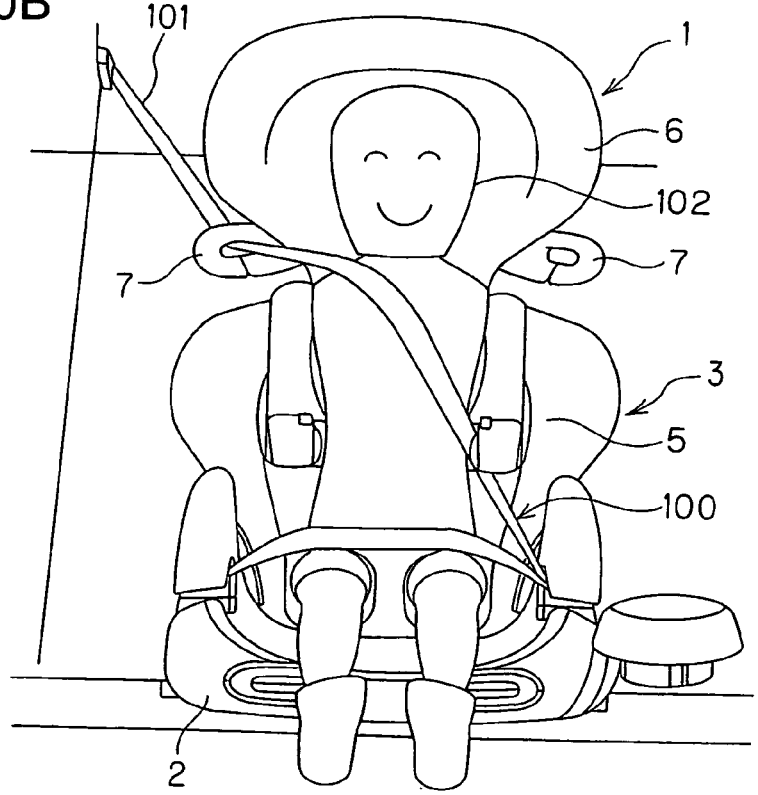
FIG. 10B is a view showing a state where the shoulder belt guide is biased inward to improperly set the guide position of the shoulder belt.

As described above, in the child sheet 1 according to the embodiment, since the position in the left and right directions of the shoulder belt guide 7 can be adjusted by the belt guide positioning mechanism 20, the guide position of the shoulder belt can be properly adjusted to correspond to the shoulder width or the neck thickness of the sitter. For example, as shown in FIG. 10B, when the shoulder belt guide 7 is inclined to the inside and a shoulder belt 101 of a seat belt 100 of the vehicle comes in contact with the neck of a sitter 102, the shoulder belt 101 can be guided in a proper route from the shoulder to the breast by moving the shoulder belt guide 7 to the outside as indicated by an arrow D in FIG. 10A. Further, in the child seat 1 according to the embodiment, by attaching the shoulder belt guide 7 to the headrest body 6A through the belt guide positioning mechanism 20, it is possible to adjust the position of the shoulder belt guide 7 in the upper and lower directions. Accordingly, the guide position of the shoulder belt 101 by the shoulder belt guide 7 can be adjusted in the wider range, and thus the shoulder belt can be guided at a proper position for sitters with a variety of physical features. As a result, it is possible to sufficiently enlarge the positioning function of the headrest 6 and the range where the back portion 3 can be used properly.

As shown in FIG. 9, the shoulder belt guide 7 is provided with an expanding portion 7e formed to be swelled to a front side of the child seat 1 with respect to the base portion 7c connected to the slider 22, and the guide hole 7a of the shoulder belt guide 7 is formed in the expanding portion 7e. The reason for providing the expanding portion 7e is to forwardly bias the circumference of the guide hole 7a of the shoulder belt guide 7 with respect to the base portion 7c attached to the rear surface 6b of the headrest body 6A, and accordingly, to approximate the guide position of the shoulder belt associated with the shoulder belt guide 7 toward a shoulder of a seated person with respect to front and rear directions. A deep groove 6f for receiving the expanding portion 7e is provided in left and right inlet portions of the guide groove 6d of the headrest body 6A. In addition, the deep grove 6f is provided with a rib 6g. The rib 6g is elongated across the almost entire length of the deep groove 6f along the left and right directions. The height of the rib 6g is set so as to reach the base portion 7c of the shoulder belt guide 7. In other words, the rib 6g is formed to have a size appropriate to bury the almost entire space of the deep groove 6f in a top plan view.

On the other hand, the expanding portion 7e of the shoulder belt guide 7 is provided with a relief groove 7f for receiving the rib 6g. As shown in FIG. 9, the rib 6g is fit into the relief groove 7f in a state that the shoulder belt guide 7 is positioned in an innermost side. Meanwhile, in a state that the shoulder belt guide 7 is positioned in an outermost side (refer to FIG. 7), the relief groove 7f is biased toward outside with respect to the rib 6g, and the step portion between the expanding portion 7e and the base portion 7c moves to a position that nearly corresponds with a step portion of the outer side of the rib 6g as shown as a dashed line 7e' of FIG. 9. In other words, even when the shoulder belt guide 7 is fully pulled in an outward direction, the step portion between the base portion 7c and the expanding portion 7e is positioned in nearly the same location as that of the rib 6g of the headrest body 6A. For this reason, even when the shoulder belt guide 7 is outwardly pulled, there is no big gap between the expanding portion 7e and the headrest body 6A, so that a finger of the user of the child seat 1 is seldom caught in the gap. Furthermore, since the rib 6g is provided in the deep groove 6f, it is possible to allow the rib 6g to prevent penetration of a finger or extraneous materials into the deep grove 6f.

Then, the characteristic portions of the covers 2B, 5B, and 6B of the child seat 1 will be described. As shown in FIG. 1, the covers 2B, 5B, and 6B of the child seat 1 are provided with ventilation portions 30A, 30B, and 30C respectively. The ventilation portion 30A of the seat portion 2 and the ventilation portion 30B of the backrest 5 are connected with each other, and the ventilation portion 30C of the headrest 6 is isolated from the other ventilation portions 30A and 30B. Theses ventilation portions 30A to 30C are provided to form a recessive concave portion from the surfaces of the covers 2B, 5B, and 6B respectively. Their positions are set in nearly the center of the seat 1 in a right and left direction. As a result, the ventilation portions 30A to 30C constitute a position determining portion for positioning the hip, the back, or the head of a seated person in the center of the seat 1 in a right and left direction. Hereinafter, the ventilation portion may be represented by a reference numeral 30 when a construction common to the ventilation portions 30A to 30C is referred.

Figure 11:
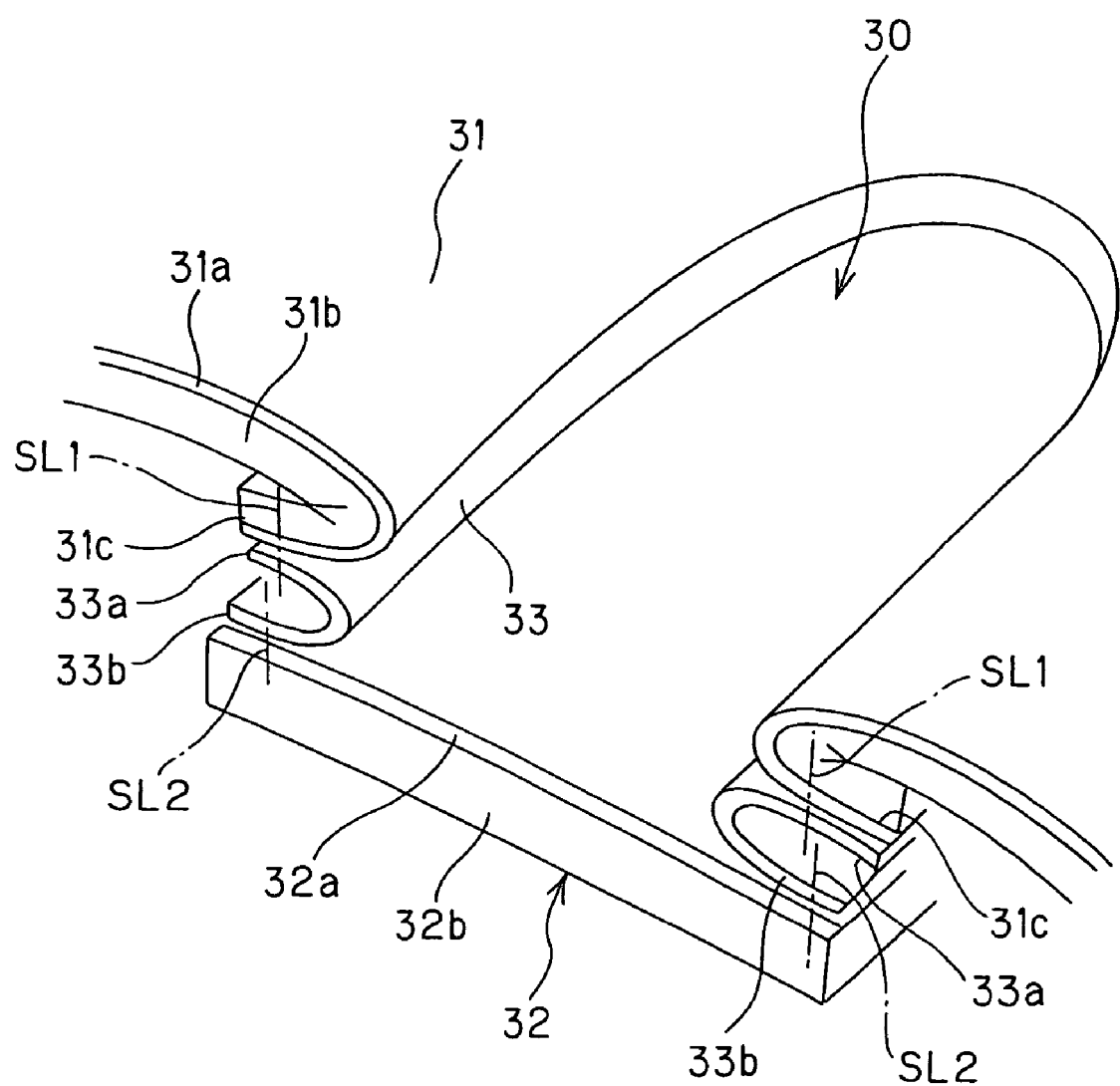
FIG. 11 is a view showing a cross-sectional structure of a ventilation portion provided in a cover.

FIG. 11 shows a cross-section of the ventilation portion 30. The cross-section of FIG. 11 is common to the ventilation portions 30A to 30C. The ventilation portion 30 is formed by combining an epidermal material 31 disposed at an outermost surface of the covers 2B, 5B, or 6B and a bottom material 32 constituting a bottom surface of the ventilation portion 30 with a gusset material 33 being interposed therebetween. The epidermal material 31 is constructed by bonding a cushion material 31b such as urethane on the rear surface of the outer cloth 31a. The epidermal material 31 is notched in association with a planar shape of the ventilation portion 30, and the edge 31c of the notched portion is folded back toward the rear surface thereof. Meanwhile, the bottom material 32 is constructed by bonding a cushion material 32b such as urethane on the rear surface of the mesh cloth 32a having ventilation property, and its shape is set to be slightly larger than that of a planar shape of the ventilation portion 30. The cushion material 32b is provided with a plurality of ventilation holes (not shown) for obtaining ventilation. The gusset material 33 is formed of a cloth. The gusset material 33 is disposed along the folded edge 31c of the epidermal material 31 such that a folded line is disposed in an inner circumference in a folded state. The folded edge 31c of the epidermal material 31 and one folded portion 33a of the gusset material 33 are sewed with each other along the sew line SL1, and the bottom material 32 and the other folded portion 33b of the gusset material 33 are sewed with each other along a sew line SL2. This sewing work allows the folded edge 31a of the epidermal material 31 to be connected with the bottom material 32 through the gusset material 33.

According to the aforementioned ventilation portion structure, since the folded gusset material 33 is interposed between the epidermal material 31 and the bottom material 32, a sufficient height difference between the epidermal material 31 and the bottom material 32 can be obtained. Therefore, it is possible to increase a ventilation effect of the ventilation portion 30 by increasing the depth of the ventilation portion 30. Also, it is possible to increase safety (position determining effect) of a seated person by the ventilation portion 30 by increasing the depth of the ventilation portion 30. In addition, when the folded edge 31c of the epidermal material 31 and the bottom material 32 are sewed with each other without providing the gusset material 33, the sewed portion is pulled up by tension of the epidermal material 31. As a result, the circumferential portion of the bottom material 32 is raised, and the depth of the ventilation portion 30 is reduced. In other words, in the ventilation portion 30 of this construction, the tension of the epidermal material 31 is buffered by the folded gusset material 33, and the tension of the epidermal material 31 is hardly propagated to the sewed portion between the gusset material 33 and the bottom material 32. For this reason, the swelling of the bottom material 32 is inhibited, and the depth of the ventilation portion 30 is enlarged.

In addition, the width and the position of the sew lines SL1 and SL2 of each of folded portions 33a and 33b of the gusset material 33 may be appropriately set based on the tension of the epidermal material 31 or the condition of the sewing work. However, since the swelling by the tension of the epidermal material 31 tends to be significantly generated as the area of the bottom material 32 is smaller, it is preferable that the width of the folded portion 33b of the gusset material 33 is enlarged as the area of the bottom material 32 is smaller. The folded position of the gusset material 33 is not necessarily identical to that of the epidermal material 31, and the folded position of the gusset material 33 may be pulled toward an inner or outer side from the folded position of the epidermal material 31. The sew lines SL1 and SL2 are not necessarily positioned in the same location, and the sew line SL2 of the gusset material 33 and the bottom material 32 may be positioned in an inner or outer side from the sew line SL1 of the gusset material 33 and the epidermal material 31. However, in order to improve the swelling prevention effect of the bottom material 32, the sew line SL2 is preferably biased toward an outer side. The gusset material 33 is not limited to one sheet, but a plurality of gusset materials 33 may be overlapped in a vertical direction. A cushion material may be provided in the rear surface of the gusset material 33. In addition, each of the seat body 2A, the backrest body 5A, and the headrest body 6A may be provided with a ventilation groove or hole in combination with the ventilation portions 30A, 30B, and 30C respectively.

Figure 12:
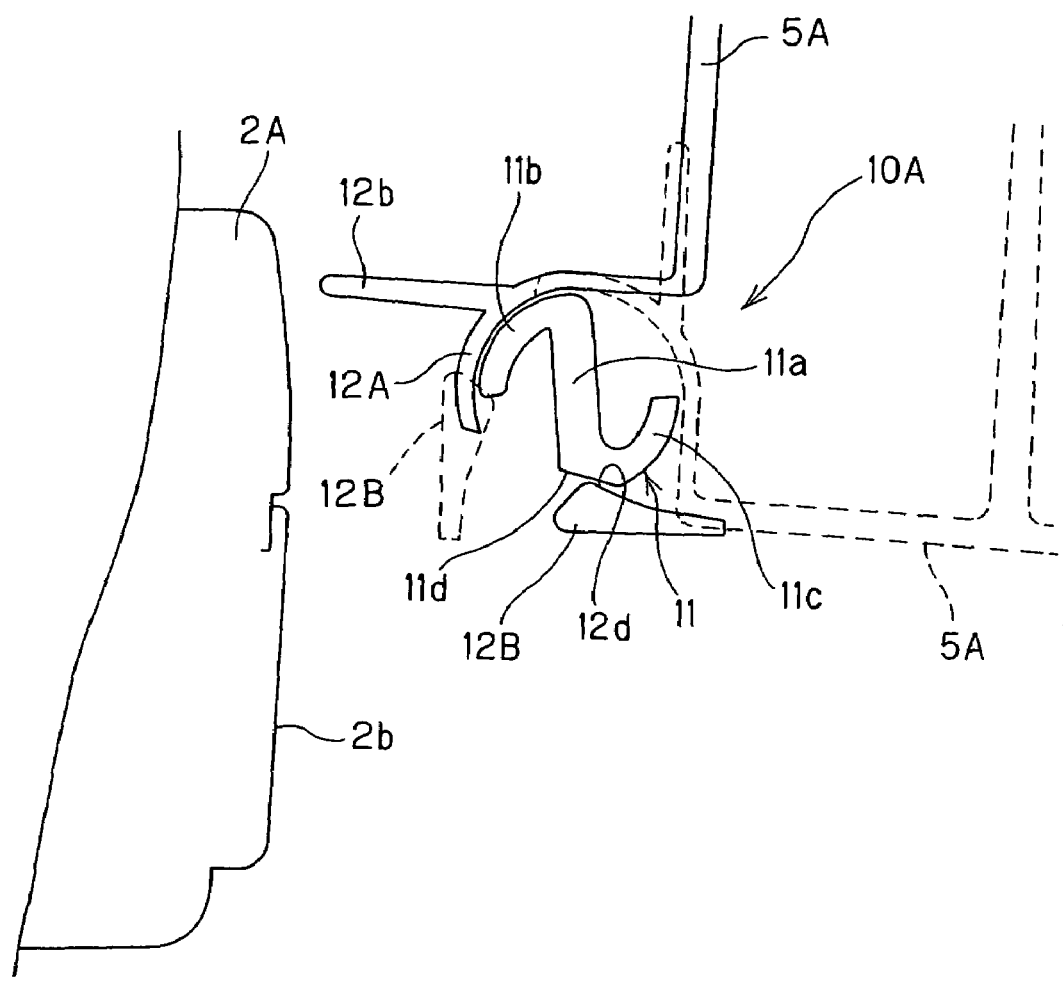
FIG. 12 is a view showing another example of a mechanism for connecting the seat body with the backrest body.

FIG. 12 shows another example of a connecting mechanism between the seat portion 2 and the back portion 3. In the connecting mechanism 10A shown in FIG. 12, the stopper 13 shown FIG. 3 is omitted, and the hook 12 of the backrest body 5A is provided with first and second hook portions 12A and 12B with the spindle 11 interposed therebetween. In a using position where the backrest body 5A stands up, the first hook portion 12A is located in an inner portion of the spindle 11, and the second hook portion 12B is located at a downstream of the spindle 11. The first hook portion 12A is provided with a stopper 12b which is arranged to protrude toward the seat body 2A to stop separation of the hook 12 from the spindle 11 when the backrest 5 is located at the using position. The circumferential interval between the first and second hook portions 12A and 12B are designed to be smaller than a diameter of the spindle 11.

In the connecting mechanism 10A shown in FIG. 12, when the backrest body 5A falls down at the detachment position denoted by the dotted line of the figure, the stopper 12b is released upwardly, and the second hook portion 12B is brought into contact with the curved portion 11b. Therefore, the backrest body 5A cannot rotate beyond the detachment position to the lower portion of FIG. 12. At the detachment position, the first and second hook portions 12A and 12B are brought into contacted with the circumference of the spindle 11. At the detachment position, the backrest body 5A is moved downwardly in a slanted direction so as to be separated from the seat body 2A, so that the first and second hook portions 12A and 12B are elastically deformed to widen an interval therebetween. As a result, the spindle 11 can be released from the hook 12A. In order to connect the seat portion 2 with the back portion 3, the interval between the first and second hook portions 12A and 12B are aligned with the spindle 11, and the backrest body 5A is pushed toward the seat body 2A. In this state, the interval between the hook portions 12A and 12B is widened, and the spindle 11 is inserted between the interval. In addition, a lower end of the base portion 11a of the spindle 11 and the second hook portion 12B are provided with taper portions 11d and 12d for smoothly elastically deforming the second hook portion 12B.

In the embodiment shown in FIG. 12, even if the backrest body 5A is merely moved to the detachment position with respect to the seat body 2A, the state in which the seat portion 2 and the back portion 3 are engaged with each other is maintained. Therefore, if the engagement portion is not elastically deformed, the spindle 11 and the hook 12 cannot be separated from each other. As a result, similar to the connecting mechanism 10 shown in FIG. 3, an unintentional separation between the seat portion 2 and the back portion 3 can be prevented.

Figure 13:
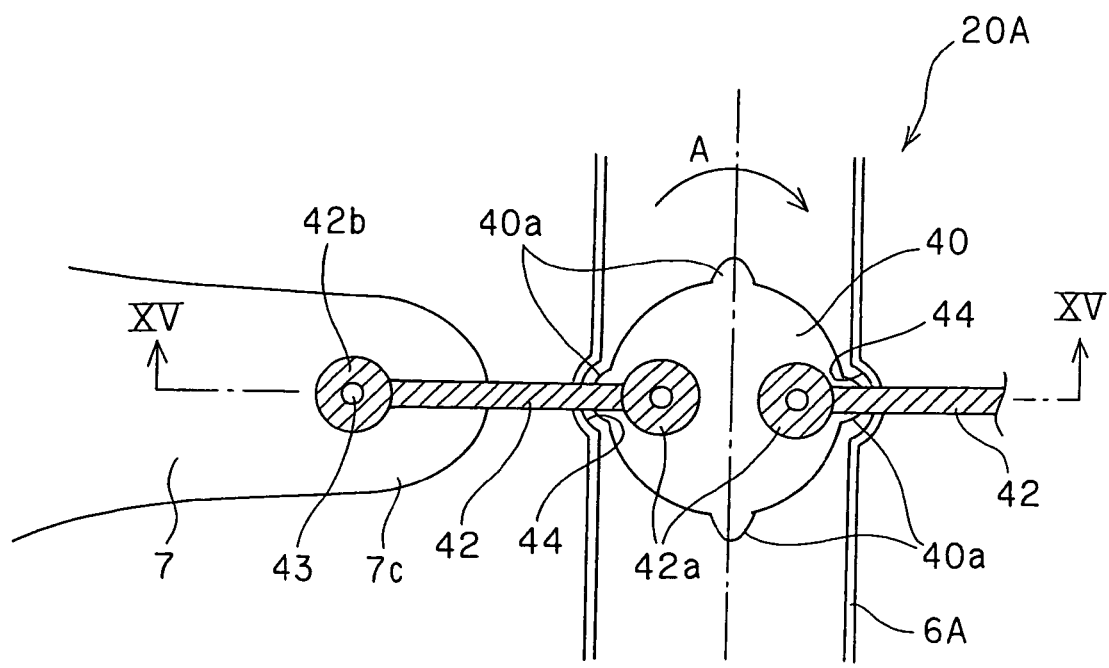
FIG. 13 is a view showing another example of a belt guide position adjusting mechanism.
Figure 14:
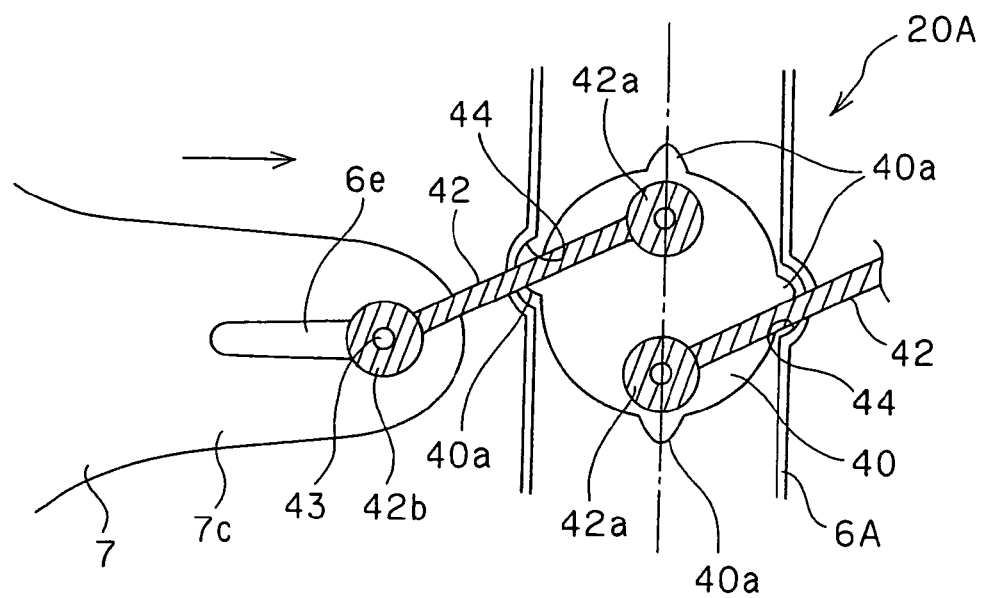
FIG. 14 is a view showing a state where the shoulder belt guide is drawn inward from the state shown in FIG. 13.
Figure 15:
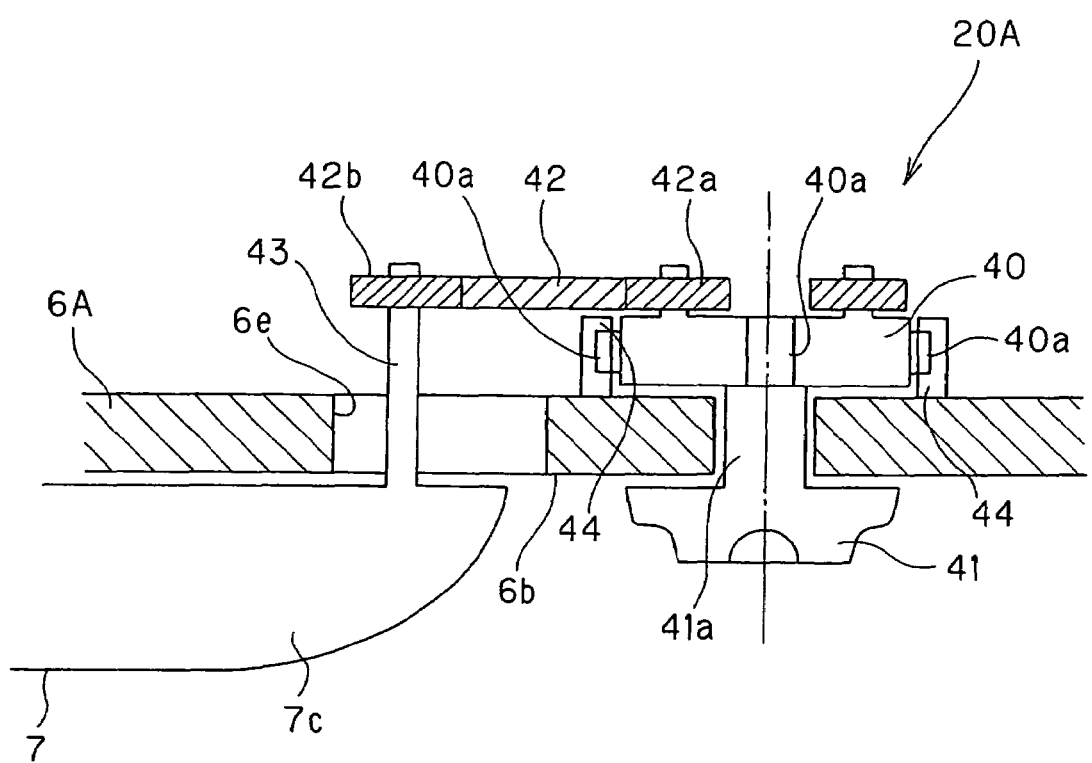
FIG. 15 is a cross-sectional view taken along the line XV-XV of FIG. 13.

FIGS. 13 to 15 show other embodiments of a belt guide position adjusting mechanism. In these embodiments, a belt guide position adjusting mechanism 20A has a lock plate 40 as a disc-shaped restricting member embedded in the headrest 6A in a state where the lock plate can rotate around an axial line which extends in the front and rear directions of the back portion 3, a manipulating knob 41 as a manipulating member for manipulating a rotation of the lock plate 40, and a pair of links 42 which connect the lock plate 40 with the base portion 7c of the shoulder belt guide 7. The manipulating knob 41 has a manipulating portion 41a which is disposed at a rear surface 6b of the headrest body 6A to be exposed to an outer surface of the back portion 3 and a connection shaft 41b which penetrates through the headrest body 6A to be inserted therein and connected to a central portion of the lock plate 40. The one end 42a of the link 42 is rotatably connected to the lock plate 40, and the other end 42b thereof penetrates from the shoulder belt guide 7 through an elongated hole 6e of the headrest body 6A to be rotatably connected to the connection shaft 43 embedded therein.

Lock protrusions 40a are provided on an outer circumference of the lock plate 40 by a separation interval of 90° in the circumferential direction, and the headrest body 6A is provided with recessed portions 44 as a pair of lock receiving portions which are selectively engaged with the lock protrusions 40a and provided on the circumference of the lock plate 40 by a separation angle of 180°. The connection positions of the link 42 and the lock plate 40 are shifted by 180° in the circumferential direction, and these positions are aligned with a pair of the lock protrusions 40a in the circumferential direction.

In the belt guide position adjusting mechanism 20A, as shown in FIG. 13, in a state where the lock protrusions 40a of which position is aligned with the one end 42a of the link 42 are engaged with the recessed portions 44, the link 42 extends in the left and right directions almost straightly, so that the shoulder belt guide 7 is maintained in a most released position at the outer side in the left and right directions. On the other hand, when the lock plate 40 is rotated from the position shown in FIG. 13 by 90° in the arrow direction A by manipulating the manipulating knob 41 around the connecting shaft 41b, as shown in FIG. 14, the other lock protrusion 40a is engaged with the recessed portion 44, so that the one end 42a of the link 42 is aligned in the up and down direction. Therefore, the connection shaft 43 is inserted along the elongated hole 6e therein. In this state, the shoulder belt guide 7 is maintained at the position in which the shoulder belt guide is further inserted into the inner portion of FIG. 13 in the left and right directions. In addition, a plurality of the lock protrusions 40a are provided with a pitch smaller than 90° in the circumferential direction, so that three or more the maintaining positions of the shoulder belt guide 7 may be arranged. Alternatively, a single lock protrusion 40a may be provided, and a plurality of recessed portions 44 may be provided around the circumference of the lock plate 40. The lock protrusions 40a may be provided to the headrest body 6A, and the recessed portions 44 may be provided to the lock plate 40. In this case, one or more lock protrusion 40a may be provided, and the number of the recessed portions 44 may be provided to correspond to the number of the maintaining positions of the shoulder belt guides 7. The lock receiving portion is not limited to the recessed portions 44, but it may be a penetrating hole, a groove, or a slit.

The present invention is not limited to the aforementioned embodiment, but it may be implemented in various suitable manners. For example, in the aforementioned embodiment, the shoulder belt guide 7 and the belt guide position adjusting mechanisms 20 and 20A are attached to the headrest 6, so that the position of the shoulder belt guide 7 can be adjusted in both of the up and down directions and the left and right directions. However, the present invention may include an embodiment where the position of the shoulder belt guide 7 may be adjusted in only the left and right directions. The shoulder belt guide may be attached to the backrest. In a case where the shoulder belt guide is attached to the backrest, a mechanism for adjusting the position of the shoulder belt guide in the up and down directions are provided to the backrest, and the shoulder belt guide may be attached to a driving portion of the mechanism in the up and down directions through the belt guide position adjusting mechanism according to the present invention. In addition, the shoulder belt guide is attached to the back portion in a state where the shoulder belt guide can rotate around the spindle which extends in the front and rear directions of the child seat, so that the position of the shoulder belt guide can be adjusted in the up and down directions as well as in the left and right directions.

In the aforementioned embodiment, the ventilation portion structure of the present invention is provided in the covers of the seat portion and the back portion of the child seat. However, the ventilation portion structure of the present invention is not limited thereto, but it may be implemented in various manners. For example, in a case where it is employed in the child seat, the ventilation portion structure of the present invention may be provided to only the seat portion or to only the back portion. The child seat structure is not limited to a type in which a sitter is restricted by using a seat belt of a vehicle. The ventilation portion structure may be employed in a child seat in which a sitter who is fastened to a seat of the vehicle by using the seat belt for the vehicle is restricted by a seat belt itself. In addition, the ventilation portion structure of the present invention may be employed in a booster type child seat in which only the seat portion is provided. In addition, in other various child products, other than child seat, such as a baby car, a baby rack, a baby carrier, a baby belt, shoes, clothes, and a mat, the ventilation portion structure of the present invention may be provided to a surface where the baby is contact with. The ventilation portion structure of the present invention is not limited to the child products, but is may be employed to covers provided to surfaces of various products, with which a user is in contact. For example, the ventilation portion structure of the present invention may be employed in covers of various products such as chair, sofa, clothes, hat, shoes, and bedclothes or in covers which are integrally formed together with these products.

What is claimed is:

1. A child seat having a seat portion and a back portion in which the back portion is provided with a shoulder belt guide for guiding a shoulder belt of a seat belt of a vehicle from around the shoulder to the chest of a sitter comprising: a belt guide position adjusting mechanism for changing the position of the shoulder belt guide in the left and right directions of the back portion, wherein the shoulder belt guide is movably mounted in the left and right directions relative to a body of the back portion, wherein the belt guide position adjusting mechanism comprises a slider which can be integrally moved with the shoulder belt guide in the left and right directions, a restricting member which can be moved between a restriction position adjacent to the slider and a restriction releasing position separated from the slider, a biasing member for biasing the restricting member toward the restriction position, and a manipulating member having a manipulating portion exposed on the outer surface of the back portion which causes the restricting member to move from the restriction position to the restriction releasing position by manipulating the manipulating portion, wherein a base portion of the shoulder belt guide is disposed at the rear surface side of the back portion, a guide groove for receiving the base portion of the shoulder belt guide is provided in the body of the back portion, and the slider is embedded in the body of the back portion so as to be located at the front side of the back portion relative to the base portion, and wherein a lock protrusion is provided on any one of the slider and the restricting member, and a plurality of lock receiving portions, which is engaged with the lock protrusion when the restricting member is disposed at the restriction position and is released from the lock protrusion when the restricting member is disposed at the restriction releasing position, is provided on the other of the slider or the restricting member in line along the left and right directions.

2. The child seat according to claim 1, wherein the slider and the shoulder belt guide are connected to each other through a connection shaft which penetrates through an elongated hole of the left and right directions provided in the body of the back portion, the restricting member is embedded in the body so as to face the slider from the rear side of the back portion, the lock protrusion and the lock receiving portions are provided between the facing surfaces of the slider and the restricting member, and the manipulating member is connected to the restricting member such that the manipulating portion is exposed to the rear surface of the back portion and the manipulating portion and the restricting member can be integrally moved in the front and rear directions of the back portion.

3. The child seat according to claim 2, wherein an expanding portion which expands toward the front side of the back portion further away from the base portion outward in the left and right directions of the base portion is provided on the shoulder belt guide, a deep groove portion which receives the expanding portion when the shoulder belt guide is drawn inward in the left and right directions is provided in the guide groove of the back portion, a rib is provided in the deep groove portion, and a relief groove for receiving the rib is provided in the expanding portion.

4. The child seat according to claim 1, wherein the back portion comprises a backrest which supports the back of the sitter and a headrest which is provided such that the position thereof can be adjusted relative to the backrest in the upper and lower directions and supports the head of the sitter, and the shoulder belt guide and the belt guide position adjusting mechanism are provided in the headrest.

* * * * *